United States Patent [19]
Muth et al.

[11] Patent Number: 5,602,471
[45] Date of Patent: Feb. 11, 1997

[54] ANGLE SENSOR INCLUDING ANGULARLY SPACED SENSOR UNITS

[75] Inventors: Michael Muth, Stelle; Volker Graeger, Buchholz; August Petersen, Henstedt-Ulzburg, all of Germany

[73] Assignee: U.S. Philips Corporation, New York, N.Y.

[21] Appl. No.: 401,066

[22] Filed: Mar. 8, 1995

[30] Foreign Application Priority Data

Mar. 10, 1994 [DE] Germany .................. 44 08 078.6

[51] Int. Cl.$^6$ .................. G01B 7/30; G01R 33/09; G01D 5/14
[52] U.S. Cl. .................. 324/207.21; 324/207.25; 324/252
[58] Field of Search ............... 324/165, 166, 324/173, 174, 207.2, 207.21, 207.25, 251, 252; 123/612, 617, 414; 340/672; 341/15

[56] References Cited

U.S. PATENT DOCUMENTS

| | | | |
|---|---|---|---|
| 4,415,856 | 11/1983 | Welles | 324/207.25 |
| 4,492,922 | 1/1985 | Ohkubo | 324/207.21 |
| 4,616,281 | 10/1986 | Nakamura | 324/207.21 X |
| 4,791,366 | 12/1988 | Suzuki et al. | 324/207.25 |
| 5,252,919 | 10/1993 | Uemura | 324/207.25 |
| 5,486,759 | 1/1996 | Seiler et al. | 324/207.25 X |

FOREIGN PATENT DOCUMENTS

| | | | |
|---|---|---|---|
| 0217478 | 4/1987 | European Pat. Off. | |
| 0317776A2 | 5/1989 | European Pat. Off. | G01D 5/244 |
| 3126047A1 | 6/1982 | Germany | G01D 5/243 |
| 3826408 | 2/1989 | Germany . | |
| 5941882 | 3/1984 | Japan . | |

OTHER PUBLICATIONS

Mohammed S. Ghausi "Electronic Devices and Circuits – Discrete and Integrated" 1985, CBS College Publishing, New; York, p. 439.

*Primary Examiner*—Gerard R. Strecker
*Attorney, Agent, or Firm*—Arthur G. Schaier

[57] ABSTRACT

An angle sensor includes at least two angularly spaced sensor units which measure in a contactless manner and whose sensor voltages are similar but angularly shifted sinusoidal functions (sensor characteristic) of the angle $\alpha$ to be measured relative to a rotatable element and a processing circuit forms an angle sensor voltage which is a measure of the angle $\alpha$. Using limited analog circuitry, a wide angular range is obtained and also a monotonously increasing angle sensor voltage which is dependent as linearly as possible on the angle to be measured, in that the sensor voltages are direct voltages which are constant in time. The processing circuit includes limiter circuits (15) whose input receives the sensor voltages (UMA, UMB), and whose output voltages exhibit values (10, 11) which remain constant when a limit value of the sensor voltages is exceeded, and that the output voltages of the limiter circuits (15) are applied to the input of a summing circuit (16) in order to form the angle sensor voltage.

21 Claims, 3 Drawing Sheets

ANGLE SENSOR INCLUDING ANGULARLY SPACED SENSOR UNITS

BACKGROUND OF THE INVENTION

1. Field of the Invention

The invention relates to an angle sensor, including at least two angularly spaced sensor units which measure in a contactless manner and whose sensor voltages are similar but angularly shifted sinusoidal functions (sensor characteristic) of the angle $\alpha$ to be measured relative to a rotatable element, and also including a processing circuit for forming an angle sensor voltage which is a measure of the angle $\alpha$.

2. Description of the Related Art

An angle sensor of this kind is described in EP-A 217 478. The sensor units therein form alternating voltage signals of an amplitude which is dependent on the angle of rotation.

DE-C 3 826 408 discloses a choke valve angle sensor in combustion engines which comprises a single magnetoresistive sensor element which forms a voltage which is constant in time and which is sinusoidally dependent on the measuring angle.

The Abstract in English of JP-A 59-41882 describes a sensor assembly consisting of two interleaved magnetoresistive sensor units whose bridge elements succeed one another in an alternating fashion.

SUMMARY OF THE INVENTION

It is an object of the invention to construct an angle sensor of the kind set forth in such a manner that, using few analog circuit means, a monotonous angle sensor voltage which is dependent as linearly as possible on the angle to be measured is obtained in a wide angular range. This object is achieved in that the sensor voltages are direct DC-voltages which are constant in time, that the processing circuit comprises limiter circuits whose input receives the sensor voltages and whose output voltages have values which remain constant when a limit value of the sensor voltages is exceeded, and that the output voltages of the limiter circuits are applied to the input of a summing circuit in order to form the angle sensor voltage.

As a result of the successive superposition of sub-voltages which increase to a limit value with a ramp in dependence on the angle (hereinafter referred to as "ramp characteristics"), a wide linearity range is obtained for the angle sensor voltage and/or a wider angular measuring range.

Preferably there will be provided two sensor units whose sensor characteristics (i.e. sensor voltage vs. angle) are sinusoidal functions angularly shifted through $\pi/2$. However, it is also possible to provide more than two sensor units which are arranged at equal angular distances from one another.

The larger the number of available, mutually shifted sensor characteristics, the more accurately the linearity of the characteristic of the angle sensor voltage can be achieved in a predetermined measuring range or the wider a measuring range can be achieved.

In a preferred embodiment at least one linear combination of the sensor voltages is provided to form an indirect sensor voltage in such a manner that there is obtained an indirect sensor characteristic which is angularly shifted relative to the direct sensor characteristics (i.e. actual sensor voltage vs. angle), and that the indirect sensor voltage is applied to a further limiter circuit whose output voltage is applied to the input of the summing circuit. An attractive increase of the number of available sensor characteristics is thus achieved by the formation of at least one indirect sensor characteristic by combination of the direct sensor characteristics.

Preferably there is formed a plurality of indirect sensor voltages which constitute indirect sensor characteristics in conjunction with the direct sensor characteristics, which indirect sensor characteristics extend at regular distances from one another in an angularly shifted manner, all direct and indirect sensor voltages being applied to limiter circuits whose output voltages are added by a summing circuit.

An irregular distribution of the direct and indirect sensor characteristics can also be provided, for example if given parts of the characteristic of the angle sensor voltage should preferably be linearized.

Ramp characteristics with a proportionality range between two constant ranges occur on the outputs of the limiter circuits.

In a simple embodiment the proportionality ranges of the sensor characteristic which are situated between the ranges limited to constant values essentially directly adjoin one another.

Because of tolerances, the transition from one proportionality range to the next proportionality range may occur at an angle which is either too small or too large, so that perpendicular or excessively steep variations of the characteristic of the angle sensor voltage occur in the transitional range. Such effects can be mitigated when at least two, but preferably at least three proportionality ranges overlap one another over an angular range.

The angle measuring range can be increased by circuit means which sustain the range of the output voltages of the limiter circuits which remains constant upon moving away from the proportionality range, even when the sensor voltage drops below the limit values.

Magnetoresistive sensor units consisting of four bridge elements each are particularly suitable for the invention. An angularly shifted, similar behavior of two or more of such sensor units is achieved, using only limited magnet system means, in that the bridge elements of the sensor units are angularly arranged around a center in an alternating sequence.

BRIEF DESCRIPTION OF THE DRAWING

The invention will be described in detail hereinafter with reference to the embodiments shown in the drawing, wherein:

FIGS. 5a and 5b show different numbers of ramp characteristics usable in the block diagram of FIG. 5a, and FIG. 6 shows a detailed example of the circuit when 14 sensor characteristics are used.

DETAILED DESCRIPTION OF THE PREFERRED EMBODIMENTS

Figure 1:
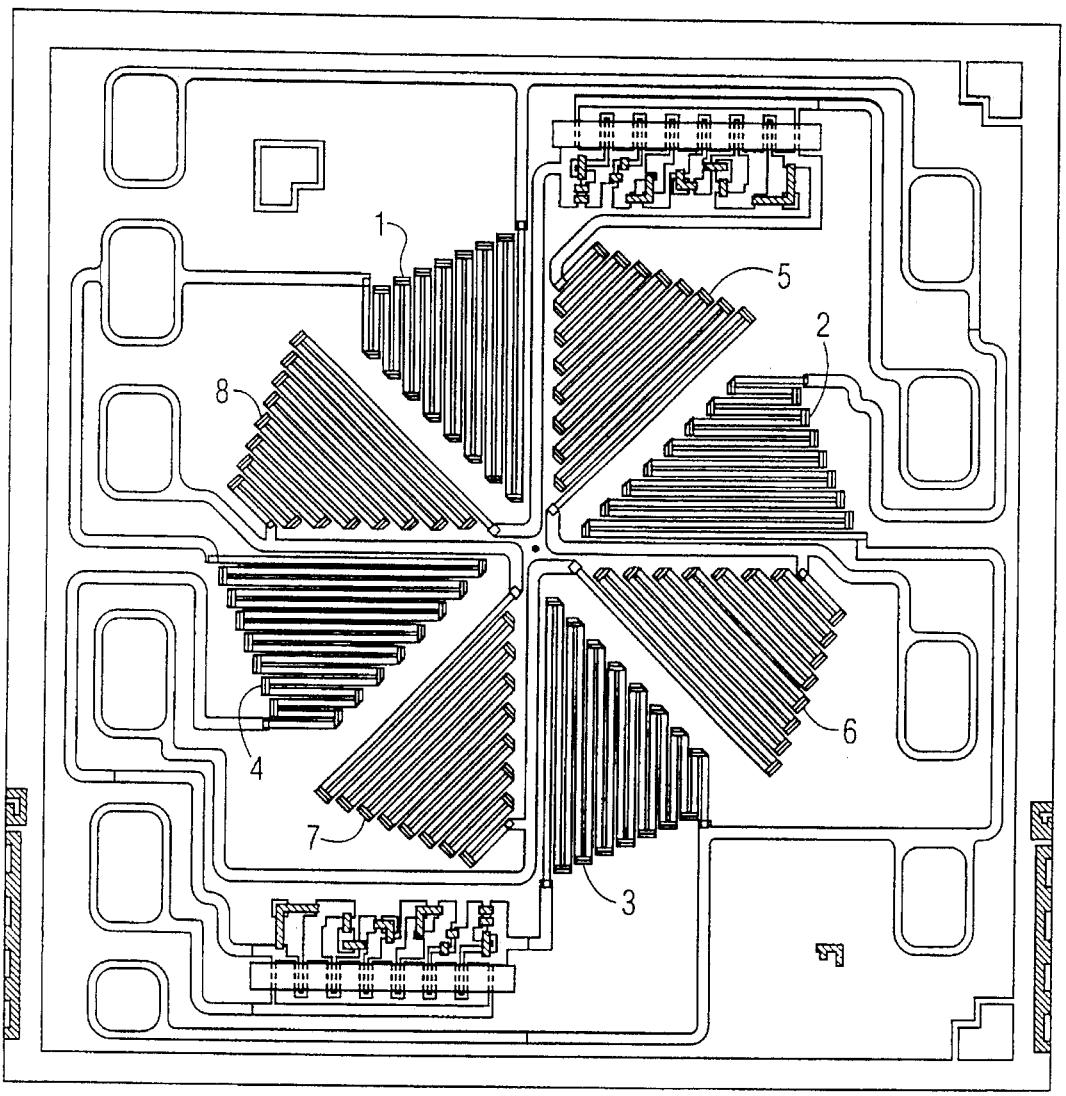
FIG. 1 shows a chip comprising two interleaved sensor units.

Two sensor units comprising bridge elements 1, 2, 3 and 4, and 5, 6, 7 and 8, respectively, are mounted in an interleaved fashion on the chip shown in FIG. 1. A bridge element of one sensor unit is always succeeded by a bridge element of the other sensor unit with a shift in space of 45° around a common center.

Figure 2A:
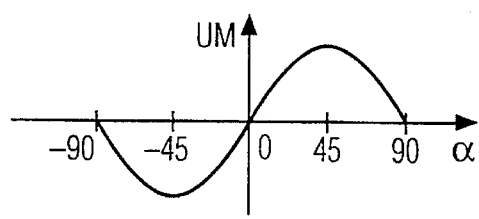
FIG. 2a and 2b show the basic variation of a sensor characteristic and a derived ramp characteristic, respectively.
Figure 2B:
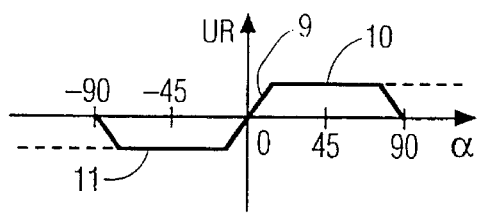

Each sensor unit forms a measuring voltage UM which varies sinusoidally with a period of 180° in dependence on the angle α in FIG. 2a. In accordance with the invention, a ramp characteristic as shown in FIG. 2b is formed from a sensor characteristic as shown in FIG. 2a, which ramp characteristic exhibits a proportionality range 9 between two constant ranges 10 and 11. The variation denoted by a solid line suffices for as long as the angle measuring ranges to be covered are not too large. However, if a sufficiently accurate and linear measurement of the angle is required in a large angular range, steps must be taken to ensure that the constant ranges 10, 11 are extended to the right and to the left, respectively, as denoted by dashed lines.

Figure 3:
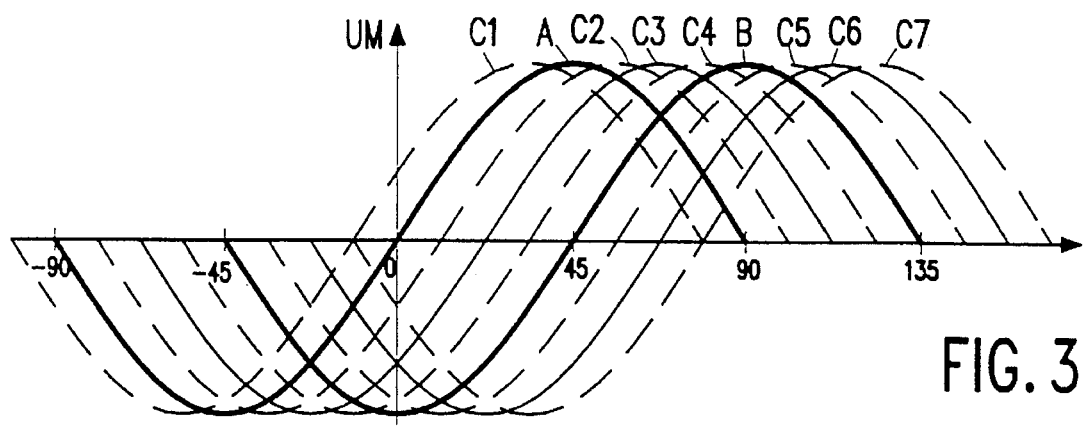
FIG. 3 shows the relative position of two direct sensor characteristics and several indirect sensor characteristics derived therefrom.

The sensor units shown in FIG. 1 supply sensor characteristics A and B as shown in FIG. 3 as direct sensor characteristics. Indirect sensor characteristics C1 to C7, as shown in FIG. 3, are formed by linear combinations of the direct sensor characteristics A and B in such a manner that all characteristics succeed one another with the same angular shift when the amplitude is the same. The voltage UMCx of a characteristic Cx is obtained by weighted addition of the measuring voltages UMA and UMB of the characteristics A and B:

$$UMCx = (ax * UMA + bx * UMB)/\sqrt{ax^2 + bx^2}$$

The weighting factors ax and bx are equal for the characteristic C3.

Figure 4:
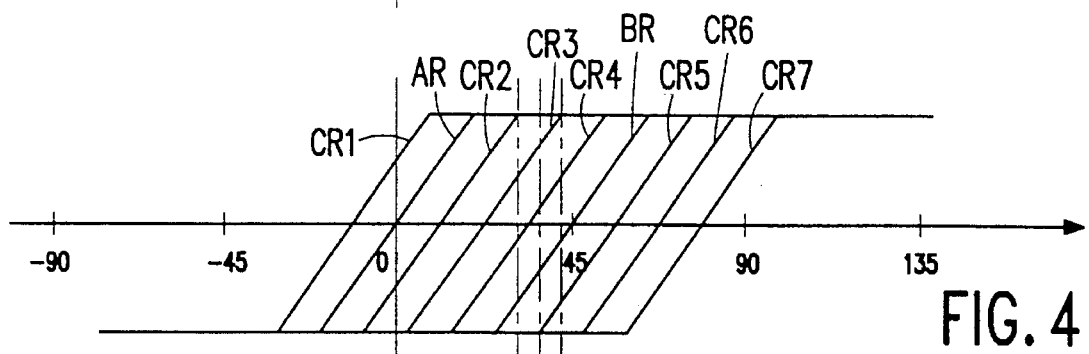
FIG. 4 shows ramp characteristics derived from the sensor characteristics shown in FIG. 3.

Using suitable circuit elements, associated ramp characteristics AR, BR as well as CR1 to CR7 as shown in FIG. 4 can be formed from the direct and indirect sensor characteristics of FIG. 3. These ramp characteristics must be added so as to form the resultant characteristic of the angle sensor voltage. Two alternating ranges 12 and 13 are then formed in which either 3 or 4 proportionality ranges are superposed. The small slope fluctuations then remaining in the characteristic of the angle sensor voltage can be tolerated as acceptable tolerances.

Figure 5A:
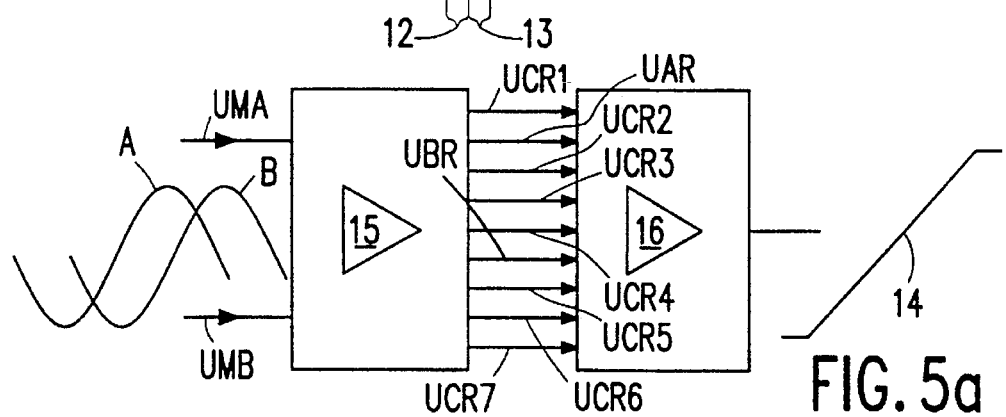
FIG. 5a shows a block diagram for forming the angle-dependent characteristic of the angle sensor voltage from two sensor voltages in accordance with the invention.
Figure 5B:
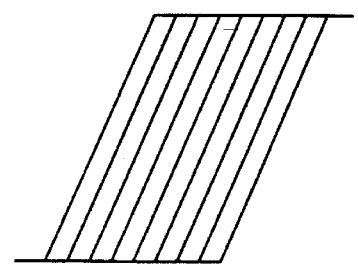

FIG. 5a shows an appropriate block diagram for the formation of the resultant angle sensor characteristic 14 from the original sensor characteristics A and B of the sensor units shown in FIG. 1. The converter circuit 15 converts voltages UMA and UMB in conformity with the characteristics A and B into voltage UCR1 to UCR7 in conformity with the characteristics CR1 to CR7 of FIG. 4, as is also indicated in FIG. 5b.

The summing circuit 16 forms a summing voltage in the form of the resultant angle sensor characteristic 14.

Figure 5C:
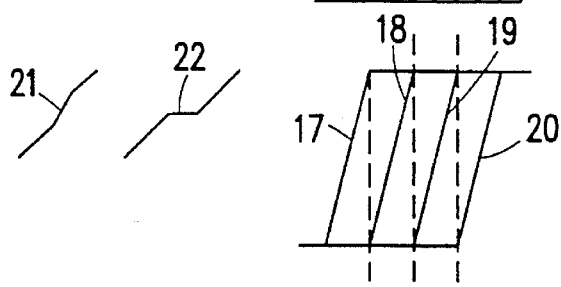

In a simplified embodiment, fewer ramp characteristics, for example four ramp characteristics 17, 18, 19 and 20 according to FIG. 5c can be formed, their proportionality ranges succeeding one another without overlap and without angular spacing. However, because of inevitable manufacturing tolerances it must then be accepted that a next proportionality range commences at an angle which is either too small or too large. In the former case there will be formed ranges 21 in which the slope is too steep, whereas in the latter case ranges 22 without a slope in the angle sensor characteristic will be formed.

Figure 6:
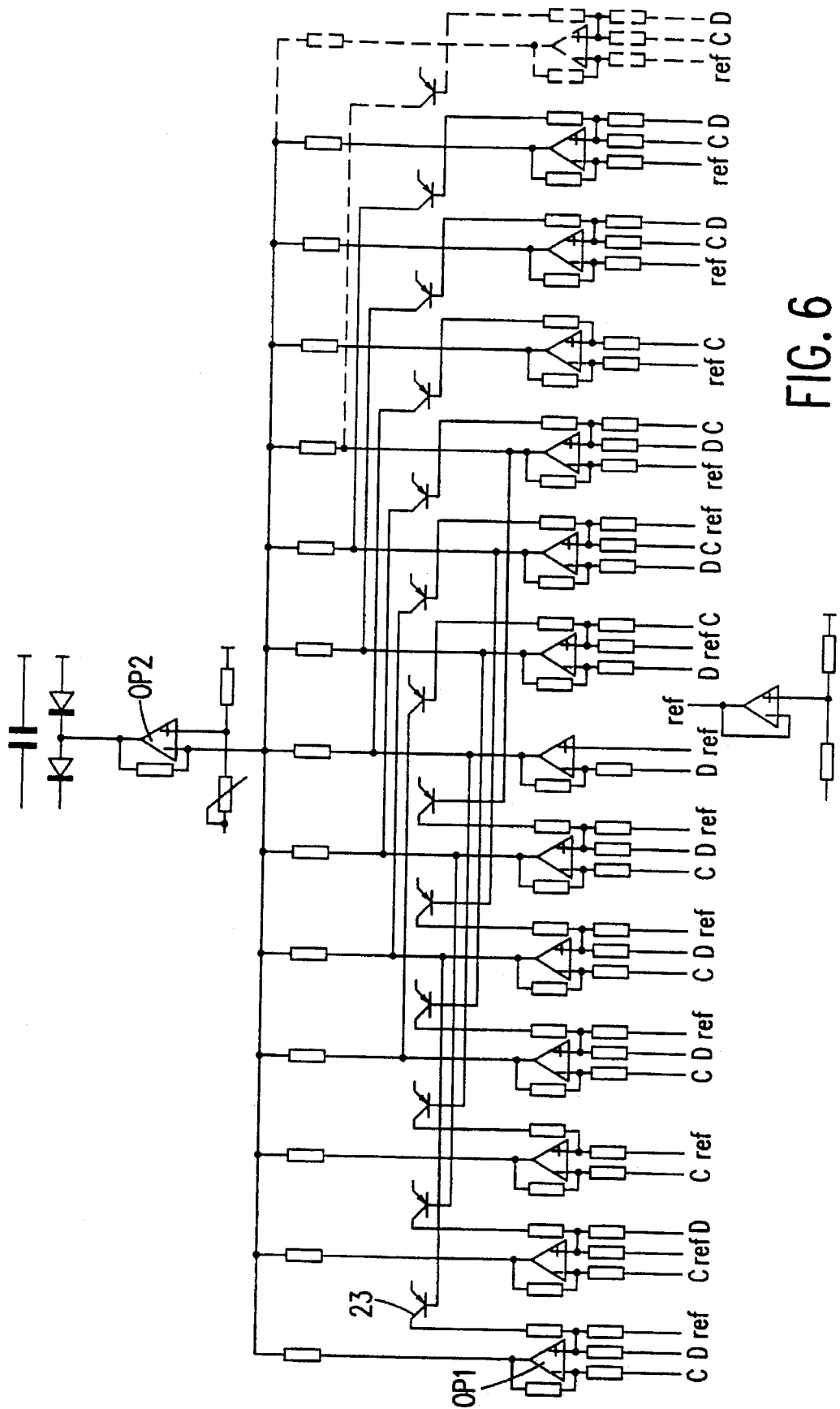

FIG. 6 shows a circuit diagram for the formation and superposition of a total of 14 ramp characteristics. With each ramp characteristic there is associated an operational amplifier OP1, the letters C and D denoting the sensor voltages of the sensor units whereas the reference ref denotes a reference voltage. The factors ax and bx, described with reference to FIG. 1, are preset by way of resistor combinations. Transistors 23 acting as diodes ensure that the variation of the ramp characteristics is constant over an extended range in conformity with the dashed ranges of FIG. 2b.

The summing operational amplifier 0172 superposes the 14 ramp characteristics. The dashed representation of the lowermost switching element for the fourteenth ramp characteristic denotes that an arbitrary number of ramp characteristics can be formed in an analogous way. The improvement of the linearity and/or measuring range of the characteristic of the angle sensor voltage then obtained, evidently, is accompanied by an increased requirements as regards circuitry; however, this is acceptable in the case of an integrated circuit construction.

We claim:

1. An angle sensor for forming an angle sensor voltage which is a measure of an angle α indicating the orientation of a rotatable element relative to the angle sensor, said angle sensor comprising:

first and second angularly spaced apart sensor units which measure the orientation of the rotatable member in a contactless manner in accordance with respective sensor characteristics such that respective first and second sensor voltages of the first and second sensor units are similar but angularly shifted sinusoidal functions of the angle α to be measured;

circuit means responsive to the first and second sensor voltages for forming at least three output voltages having values which are a measure of the angle α over different respective proportionality ranges, and which remain at limit values when the angle α is outside the respective proportionality range; and a summing circuit having inputs and an output, said inputs of said summing circuit being connected to the output voltages of the circuit means and wherein the angle sensor voltage is formed at the output of said summing circuit.

2. An angle sensor as claimed in claim 1, wherein the proportionality ranges of the output voltages of the circuit means essentially directly adjoin one another.

3. An angle sensor as claimed in claim 2, wherein said circuit means sustain the range of the output voltages so that they remain at the limit values outside the proportionality range, even when the sensor voltage drops below the limit values.

4. An angle sensor as claimed in claim 2, wherein the sensor units are magnetoresistive sensors, each of which consists of four bridge elements, the bridge elements of the sensors being angularly arranged around a center in an alternating sequence.

5. An angle sensor as claimed in claim 1, wherein the proportionality ranges of at least two of the output voltages of the circuit means overlap one another over a range of the angle α.

6. An angle sensor as claimed in claim 5, wherein said circuit means sustains the range of its output voltages so that they remain at the limit values outside the proportionality range.

7. An angle sensor as claimed in claim 5, wherein the sensor units are magnetoresistive sensors, each of which consists of four bridge elements, the bridge elements of the sensors being angularly arranged around a center in an alternating sequence.

8. An angle sensor as claimed in claim 1, wherein said circuit means sustains the range of its output voltages so that they remain at the limit values outside the proportionality range.

9. An angle sensor as claimed in claim 8, wherein the sensor units are magnetoresistive sensors, each of which consists of four bridge elements, the bridge elements of the sensors being angularly arranged around a center in an alternating sequence.

10. An angle sensor as claimed in claim 1, wherein the sensor units are magnetoresistive sensors, each of which consists of four bridge elements, the bridge elements of the sensors being angularly arranged around a center in an alternating sequence.

11. An angle sensor as claimed in claim 1, wherein the proportionality ranges of the sensor characteristic are situated between the ranges limited to constant values essentially directly adjoin one another.

12. An angle sensor as claimed in claim 1, wherein at least four output voltages are formed by the circuit means, having values which are a measure of the angle $\alpha$ over different respective proportionality ranges, and which remain at limit values when the angle $\alpha$ is outside the respective proportionality range.

13. An angle sensor as claimed in claim 12, wherein the sensor units are magnetoresistive sensors, each of which consists of four bridge elements, the bridge elements of the sensors being angularly arranged around a center in an alternating sequence.

14. An angle sensor as claimed in claim 12, wherein the proportionality ranges of the output voltages essentially directly adjoin one another.

15. An angle sensor as claimed in claim 14, wherein said circuit means sustains the range of its output voltages so that they remain at the limit values outside the proportionality range.

16. An angle sensor as claimed in claim 14, wherein the sensor units are magnetoresistive sensors, each of which consists of four bridge elements, the bridge elements of the sensors being angularly arranged around a center in an alternating sequence.

17. An angle sensor as claimed in claim 12, wherein the proportionality ranges of at least two of the output voltages overlap one another over a range of the angle $\alpha$.

18. An angle sensor as claimed in claim 17, wherein said circuit means Sustains the range of its output voltages so that they remain at the limit values outside the proportionality range.

19. An angle sensor as claimed in claim 17, wherein the sensor units are magnetoresistive sensors, each of which consists of four bridge elements, the bridge elements of the sensors being angularly arranged around a center in an alternating sequence.

20. An angle sensor as claimed in claim 12, wherein said circuit means sustains the range of its output voltages so that they remain at the limit values outside the proportionality range.

21. An angle sensor as claimed in claim 20, wherein the sensor units are magnetoresistive sensors, each of which consists of four bridge elements, the bridge elements of the sensors being angularly arranged around a center in an alternating sequence.

\* \* \* \* \*